United States Patent
Hudson et al.

(10) Patent No.: US 12,154,014 B2
(45) Date of Patent: Nov. 26, 2024

(54) COMPUTER-IMPLEMENTED METHOD FOR TRAINING A PLURALITY OF COMPUTERS

(71) Applicant: THOUGHTRIVER LIMITED, Cambridgeshire (GB)

(72) Inventors: Dominic Hudson, London (GB); Timothy Pullan, London (GB)

(73) Assignee: Thoughtriver Limited, Cambridgeshire (GB)

(*) Notice: Subject to any disclaimer, the term of this patent is extended or adjusted under 35 U.S.C. 154(b) by 961 days.

(21) Appl. No.: 16/986,664

(22) Filed: Aug. 6, 2020

(65) Prior Publication Data

US 2021/0019667 A1 Jan. 21, 2021

Related U.S. Application Data

(63) Continuation of application No. PCT/GB2019/050309, filed on Feb. 6, 2019.

(30) Foreign Application Priority Data

Feb. 7, 2018 (GB) .................................. 1802000

(51) Int. Cl.
*G06N 20/20* (2019.01)
*G06N 5/04* (2023.01)

(52) U.S. Cl.
CPC ............... *G06N 20/20* (2019.01); *G06N 5/04* (2013.01)

(58) Field of Classification Search
CPC .......... G06N 20/20; G06N 5/04; G06N 3/044; G06N 3/045; G06N 3/08; G06Q 50/18; G06Q 10/0633; G06Q 10/10; G06F 16/38
See application file for complete search history.

(56) References Cited

U.S. PATENT DOCUMENTS

| | | | | |
|---|---|---|---|---|
| 9,576,147 B1* | 2/2017 | McClintock | ........ | G06F 21/6227 |
| 2015/0052066 A1* | 2/2015 | Vincent | ............ | G06Q 20/38215 |
| | | | | 705/76 |
| 2016/0321468 A1* | 11/2016 | Stankiewicz | ....... | G06F 21/6254 |
| 2016/0321582 A1* | 11/2016 | Broudou | ................ | G06N 20/00 |
| 2017/0185921 A1 | 6/2017 | Zhang | | |
| 2017/0372226 A1* | 12/2017 | Costa | .................. | G06F 21/6245 |
| 2018/0018590 A1* | 1/2018 | Szeto | .................... | G16H 50/20 |

OTHER PUBLICATIONS

International Search Report, International Application No. PCT/GB2019/050309 dated Apr. 30, 2019.
(Continued)

*Primary Examiner* — Hope C Sheffield
(74) *Attorney, Agent, or Firm* — Withrow + Terranova, PLLC; Vincent K. Gustafson

(57) ABSTRACT

A computer system (10) comprises a plurality of computers (20a, 20b, 20c, 20d). Each of the computers (20a, 20b, 20c, 20d) comprises a store (22, 24, 26, 28). Each of the computers is configured to provide one or more labels to replace determined data in documents stored in the store (22, 24, 26, 28), and to produce encoded documents including the one or more labels to replace the determined data in the documents. The computer system (10) further comprises a machine learning computer system (30) configured to train the plurality of computers (20a, 20b, 20c, 20d) based on the encoded documents from the plurality of computers (20a, 20b, 20c, 20d).

18 Claims, 5 Drawing Sheets

(56) References Cited

OTHER PUBLICATIONS

Written Opinion of the International Search Authority International Application No. PCT/GB2019/050309 dated Apr. 30, 2019.
Examination Report, European Patent Application No. 19 705 788.8 dated Dec. 20, 2022.
Author Unknown, "Homomorphic encryption," Wikipedia, first published Jul. 2022, available online: [URL: https://en.wikipedia.org/wiki/Homomorphic_encryption], 10 pages.
Chen, Y., "Convolutional Neural Network forSentence Classification," A thesis presented to the University of Waterloo in fulfillment of the thesis requirement for the degree of Master of Mathematics in Computer Science, Waterloo, Ontario, Canada, 2015, 62 pages.
Haghighi, A. et al., "Coreference Resolution in a Modular, Entity-Centered Model," Human Language Technologies: The 2010 Annual Conference of the North American Chapter of the ACL, Jun. 2010, Los Angeles, California, USA, pp. 385-393, Association for Computational Linguistics, available online: [URL: http://www.aclweb.org/anthology/N10-1061].
Ho, T.K., "Random Decision Forests," Proceedings of 3rd International Conference on Document Analysis and Recognition, Aug. 14-16, 1995, Montreal, QC, Canada, IEEE, pp. 278-282.
Hochreiter, S. et al., "Long Short-term memory," Neural Computation, vol. 9, No. 8, Nov. 1997, pp. 1735-1780.
Kim, Y., "Convolutional Neural Networks for Sentence Classification" Proceedings of the 2014 Conference on Empirical Methods in Natural Processing (EMNLP), Oct. 2014, Doha, Qatar, Association for Computational Linguistics, pp. 1746-1751.
Mikolov, T. et al., "Distributed Representations of Words and Phrases and their Compositionality," arXiv: 1310.4546v1 [cs.CL], Oct. 16, 2013, 9 pages, available online: [URL: https://arxiv.org/abs/1310.4546].
Schuster, M. et al., "Bi-Directional Recurrent Neural Networks," IEEE Transactions on Signal Processing, vol. 45, No. 11, Nov. 1997, IEEE, pp. 2673-2681.
Walker, S.H. et al., "Estimation of the Probability of an Event as a Function of Several Independent Variables," Biometrika, vol. 54, No. 1/2, Jun. 1967, Oxford University Press, pp. 167-179.
Examination Report for European Patent Application No. 19705788.8, mailed Jan. 4, 2022, 8 pages.
Result of Consultation for European Patent Application No. 19705788.8, mailed Apr. 24, 2023, 3 pages.
Result of Consultation for European Patent Application No. 19705788.8, mailed Apr. 26, 2023, 3 pages.
Intention to Grant for European Patent Application No. 19705788.8, mailed Feb. 28, 2024, 5 pages.
Patents Act 1977 Examination Opinion and Report under Section 17(5)(b) for United Kingdom Patent Application No. GB1802000.8, mailed Jul. 11, 2018, 9 pages.

* cited by examiner

COMPUTER-IMPLEMENTED METHOD FOR TRAINING A PLURALITY OF COMPUTERS

CROSS REFERENCE TO RELATED APPLICATIONS

Continuation of International Application No. PCT/GB2019/050309 filed on Feb. 6, 2019. Priority is claimed from British Patent Application No. 1802000.8 filed on Feb. 7, 2018. Both the foregoing applications are incorporated herein by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

FIELD OF THE INVENTION

The present invention relates to a computer system and a computer implemented method for training a plurality of computers.

BACKGROUND OF THE INVENTION

Machine learning refers to a computer system that automatically learns new routines without being explicitly programmed by a human programmer. Machine learning relies on a computer system observing and analyzing a set of data, such as pre-existing instructions and examples, in order to determine certain patterns in the data. It then allows the computer system to make more logical and consistent decisions in the future based on such determined patterns. Such systems are inherently computationally intensive.

The data provided for machine learning may originate from different sources and so may be in different formats. This can present a significant problem for a machine learning computer system.

An example of such data are legal documents, such as contracts. Contracts are written by very many different entities and are drafted in vastly different styles. Moreover, these contracts are usually confidential and thus they are not usually shared amongst different entities. Therefore, machine learning is not usually applied to a diverse range of legal contracts drafted by different sources.

BRIEF SUMMARY OF THE INVENTION

It would be desirable to provide a machine learning computer system that is capable of learning from confidential documents and, in particular contracts, in a computationally efficient and accurate manner without loss of confidentiality. Broadly, the arrangements described below provide a technical solution to the technical problem of simple and low computer processing requirements to train a machine learning computer for interpreting documents and, in the examples described, contracts.

The computer architecture of the machine learning system described herein also provides an indication of risk in a contract to a defined party or parties to the contract.

The invention is defined by the independent claims below to which reference should now be made. Optional features are set out in the dependent claims.

Arrangements are described in more detail below and take the form of a a computer system comprising a plurality of computers. Each of the computers comprises a store. Each of the computers is configured to provide one or more labels to replace determined data in documents stored in the store, and to produce encoded documents including the one or more labels to replace the determined data in the documents. The computer system further comprises a machine learning computer system configured to train the plurality of computers based on the encoded documents from the plurality of computers.

This arrangement provides the technical advantage of a machine learning computer system that is capable of learning from confidential documents and, in particular contracts, in a computationally efficient and accurate manner without loss of confidentiality.

Broadly, a system of distributed data storage is described. The system takes the form of physically distributed machine learning stores for contract intelligence. The system is enabled by predictive encoding routing tokens which enable multiple third party organisations to safely and anonymously pool machine learning training data whilst storing all contracts and training data in their own dedicated secure server environments.

The predictive encoding for named entity recognition uses a proprietary machine learning annotation schema for tagging the actors in a legal agreement. It relies on an input of a low dimensional representation of words and then deploys a deep sequential Bidirectional Long Term Short-term memory model (as described in M. Schuster, and K. K. Paliwal "*Bi-Directional Recurrent Neural Networks*" IEEE Transactions on Signal Processing, Vol. 45, No. 11, November 1997 and S. Hochreiter, and J Schmidhuber "*Long Short-term memory*" Neural Computation 9(8):1735-178, 1997 both incorporated herein by reference) to handle long term semantic dependencies in text. It then deploys this to identify co-referencing within a contract referred to herein as polarity.

The polarity identification is an important step as it joins a party in a contract with a given meaning within the contract and relates any subsequent references to the same meaning. It does this via a system of rationalised polarity or co-referencing tags to support the labelling within the data set, for example: 'Own Party' (OP), 'Counterparty' (CP) and 'Reciprocal Party' references. In doing so, it enables the system to uniformly establish meanings within a contract as they apply to "us" and "them" and so enable a user to utilise this knowledge in reviewing a contract that has not been seen by the system.

The predictive encoding combines four functions: data transit routing, contract party polarity detection (as described above), data normalisation and anonymization. The resulting data transit format means that collaborating parties can contribute diverse contract texts without manual pre-processing. This is done by partially obfuscating any sensitive data so that the resultant data can be shared with the data pool safely and securely. The resulting training sets can then generate deep interpretative models which can, for example, understand a user's or party's risk positions in a contract versus another party's risk positions by overlaying the user's or party's rule-based risk policy against the extracted polarity meanings.

Embodiments of the present invention create the means for collaborating third parties to safely and securely share sensitive legal data for machine training and automated interpretative purposes through the use of uniformly co-referenced data sets.

The shared data enables users to generate an increased quantity of data and improved quality of data in the shared data set. By doing so, users can leverage their aggregate supervised labelling efforts to create more highly trained and powerful machine learning models than would be possible working on their own. The collaborative effort has this effect because it enables an increase in training data volumes because the collaborators are pooling their efforts. It also allows a greater breadth of training because the collaborators supply a variability of contract types and styles.

The models are therefore trained to predict detailed and nuanced meanings in diverse contracts. In particular, they are able to detect polarity or co-references within contract clauses and so distinguish the risk positions of discrete contracting parties. This can be demonstrated through the following stepped example.

Step 1: Property Authoring

First, a question is developed that seeks to draw out a point of meaning within a contract (each referred to herein as a 'property'). So, for example, a user or party might want to ask: "Does the agreement specify that we have to indemnify the other party?"

Step 2: Data File (DF) Code Labelling

This property is then assigned a data file (DF) code: df-op-indemnity-general. This allows the resultant meaning to be tagged to an associated contract snippet within the data set.

Step 3: Creation of Trainable Data

The system is then populated with contracts within its data set with uniformly labelled polarity tags. So, for example, a contract clause may be labelled as follows (the labels are given in square brackets): The [Supplier OP Proxy] shall indemnify the [Customer CP Proxy] in respect of the [Supplier's OP Proxy] breach of this agreement.

Step 4: Training of Properties

Using available training data (i.e. contracts), the models are trained to appropriately recognise clauses relevant to both a positive and negative response to the property.

Step 5: Contract Review and Risk Analysis

The system is then able to interpret a contract with the following sentence as follows:

[We] will indemnify [you] in respect of [our] a breach of this agreement.

The development of properties is limitless. Through this extensible framework, the computer system is able to atomise a contract into discrete concepts and positions. In doing so, the models are being trained to recognise the contractual position as it is relevant from a specific user's or party's perspective. Once the conceptual state of the user or party is understood in the context of the contract, it can be used to assess that user's or party's risk position or correlations to real world data.

The construction and featurisation (the development of additional features) of the process for both prediction and training is such that they seek to reduce the amount of 'noise' in the underlying models. This reduces the complexity and computational requirements needed to train the available data. It also enables data security benefits to be realised as it allows a user's or party's data to remain in their own state, an effect akin to homomorphic encryption as described at: https://en.wikipedia.org/wiki/Homomorphic_encryption incorporated herein by reference.

The process is constructed using an ensemble of models comprising Logistical Regression (described in S. H. Walker and D. B. Duncan "*Estimation of the Probability of an Event as a Function of Several Independent Variables*" Biometrika Vol. 54, No. 1/2 (June, 1967), pp. 167-179 incorporated herein by reference; Convolutional Neural Networks described in Y.

Kim "Convolutional Neural Networks for Sentence Classification" Proceedings of the 2014 Conference on Empirical Methods in Natural Processing (EMNLP), pages 1746 to 1751, Oct. 25-29, 2014, Doha, Qatar incorporated herein by reference and Random Forest models described in T. K. Ho, AT&T Bell Laboratories "*Random Decision Forests*" at http://ect.bell-labs.com/who/tkh/publications/papers/odt.pdf incorporated herein by reference.

Embodiments of the invention exploit a proprietary encoding schema for universally identifying, resolving co-references and normalising party references (using an arrangement described in A. Haghighi and D. Klein "*Conference Resolution in a Modular, Entity-Centered Model*" Human Language Technologies: The 2010 Annual Conference of the North American Chapter of the North America Chapter of the ACL, pages 385-393, Los Angeles, California, US, June 2010 http://www.aclweb.org/anthology/N10-1061 incorporated herein by reference) in contractual texts. The encoding schema creates a routing vehicle/token through the combination of the DF code and the polarity label. This routing vehicle therefore has an identity across the network of available data allowing it to be universally recognised as having a specific point of meaning. This ensures labelled training examples in transit across the network/internet from diverse multiple client environments are automatically inserted into the correct polarity-sensitive models prior to training. For example, examples of clauses where own parties are giving an indemnity are only routed in transit to datasets for models addressing own party indemnities as opposed to counterparty indemnities.

The example encoding schema exploits observed semantic patterns in polarity references to generate a simplified system of party reference normalisation which is able to reduce any contract position to a question of 'us versus everyone else' which is fundamental to contract risk assessment. In the example described, any reference to the own party's formal name is given an 'OPNAME' tag, any short reference to an own party is given an 'OPPROXY' tag (as explained above in the stepped example). Likewise, a reference to any counterparty's formal name is given an 'CPNAME' tag, any short reference to a counterparty is given an 'CPPROXY' tag. Any reference that can semantically apply to any or all of the contracting parties (e.g. the word 'party') is given the 'RECIPROCAL' tag. This normalisation of different references to reciprocal tags enables the system to better understand who a user is in a contract.

The polarity encoding schema described may be automatically applied to almost any contract text using machine learning tools such as the TensorFlow (trade mark) for Named Entity Recognition system, which is an open source library for machine intelligence. By encoding in this way, diversely drafted contract provisions supplied by different organisations which all have the same substantive meaning can be normalised for use in the same machine learning model and routed in transit accordingly.

In order to ensure security and confidentiality, the example encoding schema described is also used to remove identifiable information from the relevant text extracts at the point at which they are collated from across the distributed client environments. This operates alongside other anonymization/normalisation techniques such as case and encoding normalisation, text decompression and word resampling using an arrangement described in T. Mikolov, I. Sutskever, K. Chen, G. Corrado, and J. Dean "*Distributed Representations of Words and Phrases and their Compositionality*" at https://arxiv.org/pdf/1310.4546.pdf incorporated herein by reference.

The output from the example anonymization engine described is annotated texts that have been optimised for contract interpretation and risk prediction and which can be safely inserted into trained models that are subsequently distributed to relevant client databases for use in production systems.

The collaborating parties may also customise training bias by the use of private and public labelling stores. The user or party representative can annotate texts by tagging with either a public or private status. Any private annotations are only applied to the relevant user's or party's models. As a result, where every user is contributing a mix of private and public annotations all of the resulting models will be custom to the specific user, each comprising or consisting of a unique combination of public and private annotated texts. This feature is again enabled by the polarity encoding schemas and the corresponding transit tokens in the example described.

A summary of the lifecycle of sensitive contract texts in embodiments of the present invention are as follows. A contract is processed in the encoding utility or client computer creating a derived Training Store Format with embedded polarity encoding. A client computer can use text in the training store for manual annotation or other labelling techniques such as active learning, directing the annotations to the private or public labelling stores as required. At the commencement of a training routine, public and private annotations from all participating clients are routed using the encoding vehicles/tokens. Texts are first routed to anonymization. Texts are then routed to the appropriate processors in Training Servers using encoding tokens. Once training has completed across all models, client-specific versions of the trained models are sent back to the respective secure client environments.

In an aspect of the present invention, there is provided a computer system comprising: a plurality of computers, wherein each of the computers comprises a store, and wherein each of the computers is configured to provide one or more labels to replace determined data in documents stored in the store and to produce encoded documents including the one or more labels to replace the determined data in the documents; and a machine learning computer system configured to train the plurality of computers based on the encoded documents from the plurality of computers.

A label of the one or more labels may comprise a private label or a public label, wherein the private label may be a label interpretable only by one of the plurality of computers that provided the label and the public label may be interpretable by all of the plurality of computers. The plurality of computers may be configured to assign a routing token for directing the or each of the private labels to a private store of the machine learning computer system and the or each of the public labels to a public store of the machine learning computer system. Each of the plurality of computers may be configured to store the or each private label at the store of the respective computer of the plurality of computers that provided the or each private label. The documents may comprise contracts. The determined data may comprise parties to the contracts. The plurality of computers may be configured to normalise entities in different documents by providing identical labels for certain determined data. Identical labels may label certain determined data as an own party of a contract, a counterparty of a contract and a reciprocal party of a contract. The own party label may be representative of an own party of a contract. The counterparty label may be representative of one or more counterparties of a contract. The reciprocal party label may be representative of all of the parties of a contract. The plurality of computers may be configured to assign a routing token to the one or more labels to indicate an action corresponding to the respective one or more label. Each of the plurality of computers may be configured to display an indication of party risk based on interpretation of a document following training of the plurality of computers by the machine learning computer system. Each of the plurality of computers may be configured to calculate party risk of a document by identifying at least one term in a document and comparing the at least one term with a risk policy for the identified term stored in each of the plurality of computers.

Thus, a machine learning computer system or computer architecture is provided with the technical advantage of being capable of learning from confidential documents and, in particular contracts, in a computationally efficient and accurate manner without loss of confidentiality.

In another aspect of the present invention, there is provided a machine learning computer system for training a plurality of computers, the machine learning computer system being configured to train a plurality of computers based on encoded documents from the plurality of computers; wherein the encoded documents each include one or more labels to replace determined data in documents from the plurality of computers.

In another aspect of the present invention, there is provided a computer, the computer comprising a store, an output and an input; wherein the computer is configured to: provide one or more labels to replace determined data in documents stored in the store; produce encoded documents including the one or more labels to replace the determined data in the documents; output the encoded documents from the output; and input training data from a machine learning computer system configured to train the computer based on the encoded documents and encoded documents from at least one other computer.

In another aspect of the present invention, there is provided a computer implemented method of training a plurality of computers, the method comprising each of the computers: providing one or more labels to replace determined data in documents stored in a store of each of the computers; producing encoded documents including the one or more labels to replace the determined data in the documents; and outputting the encoded document to a machine learning computer system; and the machine learning computer system training the plurality of computers based on the encoded documents from the computers.

A label of the one or more labels may comprise a private label or a public label. The private label may be a label interpretable only by one of the computers that provided the label. The public label may be interpretable by all of the computers. The computer implemented method may further comprise each of the computers assigning a routing token for directing the or each of the private labels to a private store of the machine learning computer system and the or each of the public labels to a public store of the machine learning computer system. The computer implemented method may further comprise each of the computers storing the or each private label at a store of the computer. The documents may comprise contracts. The determined data may comprise parties to the contracts. The computer implemented method may further comprise each computer normalising entities in different documents by providing identical labels for certain determined data. Identical labels may label certain determined data as an own party of a contract, a counterparty of a contract and a reciprocal party of a contract. The own party label may be representative of an own party of a contract. The counterparty label may be representative of one or more counterparties of a contract. The reciprocal party label may be representative of all of the parties of a contract. The computer implemented method may further comprise each of the computers assigning a routing token to the one or more labels to indicate an action corresponding to the respective one or more label. The computer implemented method may further comprise each of the plurality of computers interpreting a document following training of the plurality of computers by the machine learning computer system. The computer implemented method may further comprise each of the plurality of computers displaying an indication of party risk based on the interpreting. The computer implemented method may further comprise each of the plurality of computers calculating party risk of a document by: identifying at least one term in a document. The computer implemented method may further comprise each of the plurality of computers comparing the at least one term with a risk policy for the identified term stored in each of the plurality of computers.

In another aspect of the present invention, there is provided a computer implemented machine learning method of training a plurality of computers, the machine learning computer system training the plurality of computers based on encoded documents from the plurality of computers; wherein the encoded documents each include one or more labels to replace determined data in documents from the plurality of computers.

In another aspect of the present invention, there is provided a computer implemented method, the computer implemented method comprising: a computer: providing one or more labels to replace determined data in documents stored in a store of the computer; producing encoded documents including the one or more labels to replace the determined data in the documents; and outputting the encoded documents from an output of the computer; inputting training data into the computer from a machine learning computer system; and training the computer based on the encoded documents and encoded documents from at least one other computer.

In another aspect of the present invention, there is provided a computer system, the computer system comprising: a plurality of computers; and a processing computer; wherein the plurality of computers are configured to direct data to the processing computer based on a label and the label comprises one of: a private label and a public label; and wherein the processing computer is configured to process private labels and public labels and the private labels are interpretable only by the computer of the plurality of computers that provided the private label; and the public labels are interpretable by all of the plurality of computers.

The processing computer system may comprise a machine learning computer system. The machine learning computer system may be configured to train the plurality of computers based on the private labels and the public labels. Each of the plurality of computers may comprise a store and the stores are each configured to store the or each private label at the store of the respective computer of the plurality of computers that provided the or each private label.

In another aspect of the present invention, there is provided a computer implemented method, the method comprising: a plurality of computers directing data to a processing computer based on a label and the label comprising one of: a private label and a public label; and a processing computer processing private labels and public labels; wherein private labels are interpretable only by the computer of the plurality of computers that provided the private label; and the public labels are interpretable by all of the plurality of computers.

The processing computer system may comprise a machine learning computer system. The processing computer processing private labels and public labels may comprise the machine learning computer system training the plurality of computers based on the private labels and the public labels. The method may further comprise each of the plurality of computers comprising a store and the stores each storing the or each private label at the store of the respective computer of the plurality of computers that provided the or each private label.

A computer program may be provided for implementing the computer implemented method described above. A computer readable medium containing a set of instructions may be provided that causes a computer to perform the method described above. The computer readable medium may be, for example, a CD-ROM, DVD-ROM, hard disk drive, or a flash drive such as a USB memory stick.

BRIEF DESCRIPTION OF THE DRAWINGS

The invention will be described in more detail, by way of example, with reference to the accompanying drawings, in which.

DETAILED DESCRIPTION OF THE INVENTION

Figure 1:
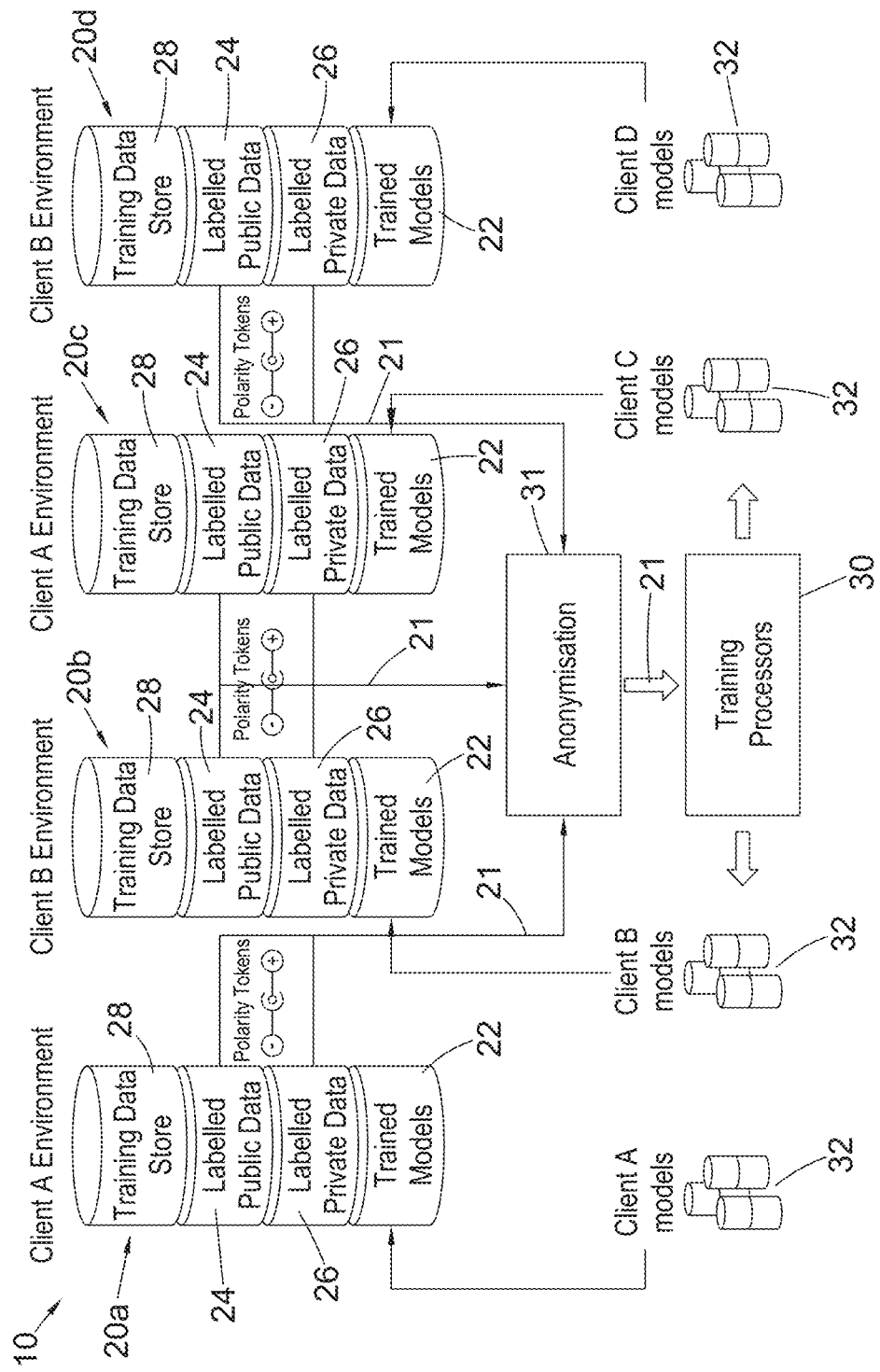
FIG. 1 is a schematic view of a computer system embodying an aspect of the present invention.

An example computer system and computer implemented or computerized method will now be described with reference to FIGS. 1 to 5. Like features are given like reference numerals throughout.

Referring first to FIG. 1, broadly, the computer system 10 normalizes and anonymizes processed data amongst a plurality of users, in order to produce machine learning models 32 at a machine learning computer system 30. More specifically, computers of the computer system are configured to exploit observed semantic patterns in polarity references of the data.

The computer system 10 of FIG. 1, forming a distributed storage arrangement, comprises a plurality of client computers or clients 20a,20b,20c,20d. Each of the computers 20a,20b,20c,20d is in communication connection, over the Internet 21, with an anonymization engine 31 in the form of a server. The anonymization engine is in communication connection, over the Internet, with a machine learning computer system or training processor 30 in the form of a server. The machine learning computer system implements machine learning using the TensorFlow (trade mark) for Named Entity Recognition system. TensorFlow is an open source software library for numerical computation using data flow graphs. Nodes in the graph represent mathematical operations. The graph edges represent multidimensional data arrays (tensors) communicated between them. The flexible architecture allows computation to be carried out in one or more central processing units (CPUs) or graphics processing units (CPUs) in a desktop, server, or mobile device with a single application programming interface (API). Each of the client computers 20a,20b,20c,20d has a store or computer storage such as a hard disk drive or solid state drive. The store forms a trained model store 22, a labelled public data store 24, a labelled private data store 26 and a training data store 28.

The trained model store 22 is for storing updated machine learning models 32 as received from the machine learning computer system 30. The training data store 28 is for storing processed or encoded data 50 that is suitable for use in training. The labelled public data store 24 is for storing data that is labelled with labels that are recognizable or interpretable by all of the computers 20a,20b,20c,20d in such a way that it can be made public without losing the confidentiality of the document it represents. Thus, the data is normalized. The private label store is for storing data that is labelled with labels that are only recognizable or interpretable by the specific computer of the computers 20a,20b,20c,20d that generate the private labels. Interpretable or recognizable means that the meaning of the label is directly understood. As part of the normalization, each of the client computers 20a,20b,20c,20d also includes a polarity token generator. This is an important part of embodiments of the present invention. The polarity token generator is implemented in software in each client computer. The polarity token generator automatically generates and applies a polarity token to the labelled public data and the labelled private data. A polarity token or reference indicates the obligations of the parties to a legal contract being processed. In other words, whether a reference to a party in the contract is made with respect to an obligor (own party or customer), obligee (counterparty or supplier) or whether it is reciprocal (applies to all of the parties). The computers assign a routing token to the data for directing or routing the or each of the private labels to a private store of the machine learning computer system and the or each of the public labels to a public store of the machine learning computer system. The routing tokens also indicate an action that should be taken to the labelled data.

The anonymization engine 31 processes the labelled data to anonymize it. The anonymization engine 31 removes or retracts any information that identifies the parties in the contract. A label stating "RETRACTED" is provided.

The anonymized data is routed from the anonymization engine 31, over the Internet 21, to the appropriate processor of the training server 30 based on the tokens that have been added to it. For example, clauses where own parties are given an indemnity are routed to models that address own party indemnities only. They are, for example, not routed to models that address counterparty indemnities.

The appropriate processor of the training server uses the received anonymized data to train a model of the training server. The results of the training are sent, over the Internet, to the trained model store 22 of the client computer or computers who are not excluded by private label annotations.

The client computers 20a,20b,20c,20d are provided with software to use their models to provide an indication of risk of one or more parties to a contract or a draft contract. Such an indication of risk is displayed on a display, such a liquid crystal display (LCD), of the client computer. The indication of risk is provided numerically, in this example, as a percentage with a low value indicating low risk and a high value indicating a high risk.

Figure 2:
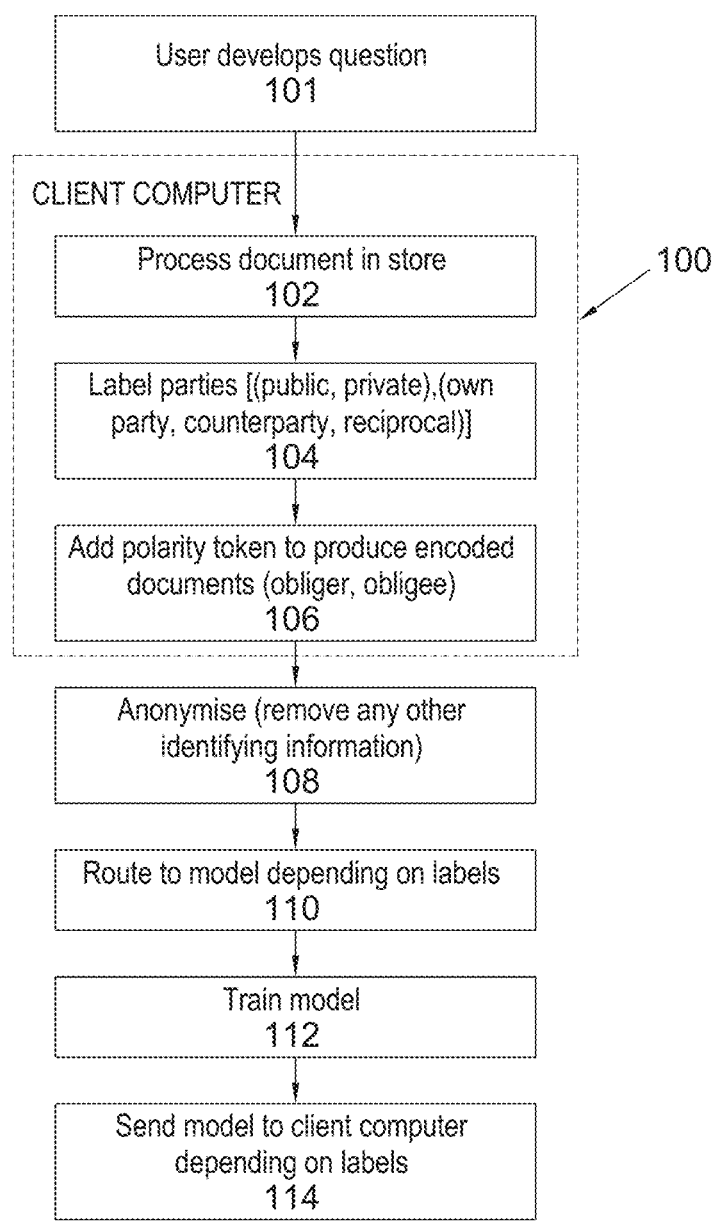
FIG. 2 is a flow diagram illustrating the computer implemented method carried out by the computer system of FIG. 1.

The computer implemented or computerized method carried out by the computer system 10 of FIG. 1 is illustrated in the flow diagram 100 of FIG. 2.

First, as illustrated at step 101, a user formulates a question that they would like answered regarding a contract, such as: "Does the agreement specify that we have to indemnify the other party?" This draws out computer interpretable meaning from the contract and forms a property of the contract. A code or data file code is then assigned to this property. In this example, the code is "df-op-indemnify-general". In this way, the meaning of a portion or snippet of a contract is tagged.

In step 102 of the flow diagram 100, each of the client computers 20a,20b,20c,20d in the computer system 10 processes or encodes a raw document in the form of a contract stored in the training data store 28.

This includes, as illustrated in step 104, the client computer labelling or encoding the parties of the contract and indicating whether a label is public or private. The labelling or encoding replaces certain or determined data in the contract. This data is the parties to the contract. The parties are referred to as own party, counterparty or reciprocal. The own party label is representative of a user of the client computer. The counterparty label is representative of other parties that are not the user of the client computer. The reciprocal or common party label is representative of all of the parties. A short reference to a party may be labelled differently to full reference. In this context, public is where the relevant portion of the document may be used for training of all models stored in all of the client computers. Private is where the relevant portion of the document may be used for training of only the models stored in the client computer labeling the document.

The encoding is carried out automatically by the client computer. A low dimensional representation of words is input into the client computer. The client computer uses a deep sequential Bidirectional Long Term Short-term memory model (as described in M. Schuster, and K. K. Paliwal "*Bi-Directional Recurrent Neural Networks*" IEEE Transactions on Signal Processing, Vol. 45, No. 11, November 1997 and S. Hochreiter, and J Schmidhuber "*Long Short-term memory*" Neural Computation 9(8):1735-178, 1997 both incorporated herein by reference) to handle long term semantic dependencies in the input text. Long Term Short-term memory is a recurrent network architecture. It is used in conjunction with an appropriate gradient based learning algorithm that enforces constant error flow through internal states of special units by truncating the gradient computation at certain architecture-specific points. It is designed to overcome error back-flow problems. The arrangement described in A. Haghighi and D. Klein "*Conference Resolution in a Modular, Entity-Centered Model*" Human Language Technologies: The 2010 Annual Conference of the North American Chapter of the North America Chapter of the ACL, pages 385-393, Los Angeles, California, US, June 2010 http://www.aclweb.org/anthology/N10-1061 incorporated herein by reference is then used to resolve conferences (references to the same thing or entity described in different ways in the raw contract). In this arrangement, a generative model is provided that exploits a large inventory of distributional entity types, including standard named-entity recognition (NER) types like PERSON and ORG. For each type, distributions over typical heads, modifiers, and governors are learned from large amounts of unlabeled data, capturing type-level semantic information. Separately from the type-entity semantic module, a log-linear discourse model captures configurational effects. A mention model assembles each textual mention by selecting semantically appropriate words from the entities and types. The model is almost entirely unsupervised. However, the encoding may also be carried out manually (either entirely or in part) by a user of the client computer selecting appropriate labels. A user interface on a display of the client computer is provided to do this.

As illustrated at step 106, the client computer then assigns a polarity token to the labels. A polarity token provides an indication of whether a party is an obligee or obliger of the particular or determined portion of the contract. So, in this example, the clause becomes: "The [Supplier OP Proxy] shall indemnify the [Customer CP Proxy] in respect of the [Supplier's OP Proxy] breach of this agreement". The labels given are in square brackets.

Thus, labels replace determined data in a document stored in the store and an encoded document is produced to include the labels to replace the determined data in the documents. By encoding in this way, diversely drafted contract provisions supplied by different organizations and third party users having the same substantive meaning are normalized, and can be subsequently routed to a machine learning computer system.

As illustrated at step 108, the anonymization engine 31 processes the labelled data to anonymize it. As explained above, the anonymization engine 31 removes or retracts any information that identifies the parties in the contract. A label stating "RETRACTED" is provided. In this example, the anonymization engine uses anonymization/normalisation techniques such as case and encoding normalisation, text decompression and word resampling using an arrangement described in T. Mikolov, I. Sutskever, K. Chen, G. Corrado, and J. Dean "*Distributed Representations of Words and Phrases and their Compositionality*" at https://arxiv.org/pdf/1310.4546.pdf incorporated herein by reference. This arrangement provides a simple method to find phrases in text.

As illustrated at step 110, the machine learning computer system 30 receives a plurality of encoded documents 50 from a plurality of client computers 20a,20b,20c,20d of the computer system 10. The encoded documents are routed by the machine learning computer system 30 to a particular training model or models depending on their labels. The models are trained on the encoded documents routed or sent to them as illustrated at step 112 of FIG. 2.

The models are trained using an ensemble or a plurality of processes. These processes include logistical regression as described in S. H. Walker and D. B. Duncan "*Estimation of the Probability of an Event as a Function of Several Independent Variables*" Biometrika Vol. 54, No. 1/2 (June, 1967), pp. 167-179 incorporated herein by reference; convolutional neural networks as described in Y. Kim "Convolutional Neural Networks for Sentence Classification" Proceedings of the 2014 Conference on Empirical Methods in Natural Processing (EMNLP), pages 1746 to 1751, Oct. 25-29, 2014, Doha, Qatar incorporated herein by reference; and random forest models as described in T. K. Ho, AT&T Bell Laboratories "*Random Decision Forests*" at http://ect.bell-labs.com/who/tkh/publications/papers/odt.pdf incorporated herein by reference. Logistical regression is a method for estimating the probability of occurrence of an event from dichotomous or polychotomous data using a recursive approach. Convolutional neural networks (CNNs) use layers with convolving filters that are applied to local features. In the arrangement described in the document in the name of Y. Kim referred to above a simple CNN is trained with one layer of convolution on top of word vectors obtained from an unsupervised neural language model. In random decision forests, multiple decision trees are built in randomly selected subspaces of a feature space. Trees in different subspaces generalize their classification in complementary ways, and their combined classification can be monotonically improved. A decision tree is a decision support tool that uses a tree-like graph or model of decisions and their possible consequences. It is a method of representing an algorithm that only contains conditional control statements. Following the training, the model can then be used to interpret a clause or portion of a contract. In this example, the original clause or portion of the contract: "The [Supplier OP Proxy] shall indemnify the [Customer CP Proxy] in respect of the [Supplier's OP Proxy] breach of this agreement" is interpreted as: "[We] will indemnify [you] in respect of [our] breach of this agreement.".

As illustrated at step 114 of FIG. 2, the trained or updated model is then sent over the Internet to the relevant client computer or computers depending on the labels.

This process is repeated. The computers are trained with many of these clauses or phrases. Different computers will be exposed to different data. The data that they are exposed to will depend on the private and public labels that are used and, in particular, the private labelled data that they have access to. This ensures confidentiality of the data.

The trained models are then used to interpret one or more contracts. The computers of the computer system do this by atomising or separating a contract into discrete concepts and positions. Typically, this takes the form of the computers separating the contract into individual clauses or sentences. The conceptual state of the user is input into the computers. The conceptual state is the entity to which a user relates to in the contract being processed.

Interpretation of the contract takes the form of providing an indication of a user's risk position that they have in a contract. The user is able to set a pre-defined risk policy for a given output to one or more properties. By way of example, for a contract, the properties may be limitation of liability, indemnity, assignment, novation or other transfer. The user can set multiple risk policies which apply for a given situation e.g. by contract type or by contracting party. For a given review of a contract, when a particular clause is identified with a given meaning by a computer 20a,20b,20c, 20d of the computer system 10 in a contract, by reference to the own party or counterparty, the risk score associated with such clause meaning is applied by the selected risk policy. This is then represented to the user for each property and is also combined to produce a weighted total risk score. This aggregated risk is calculated via predefined levels or values that result in a balanced score-card representing the user's risk position for a reviewed contract.

Figure 3:
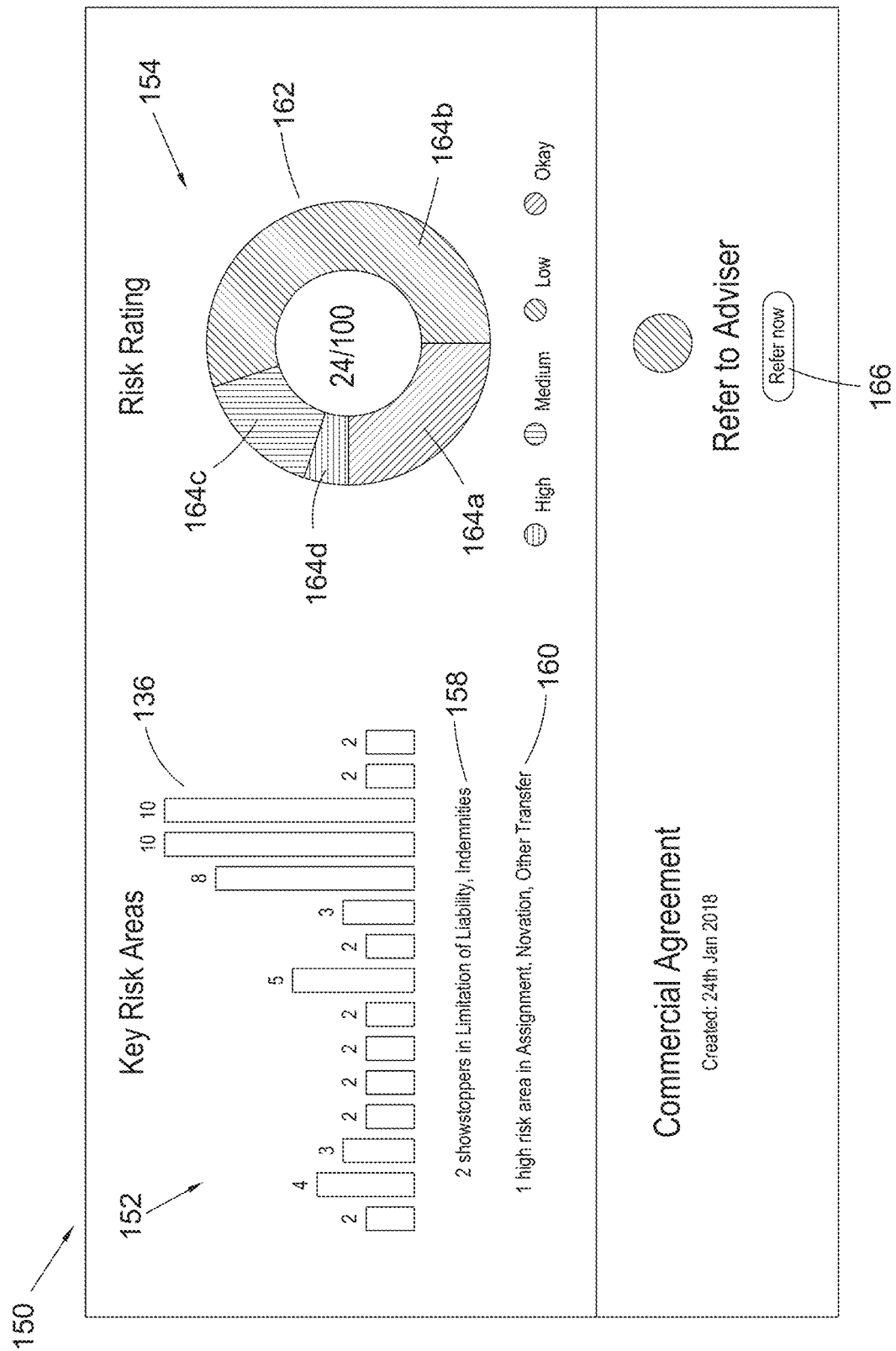
FIG. 3 is an example screen shot from a display of a computer of the computer system of FIG. 1.

An example screen shot 150 from a display (such as a liquid crystal display, LCD) of a computer 20a,20b,20c,20d of the computer system 10 is shown in FIG. 3. The display provides an indication of a user's risk position that they have in a contract and, in this example, a commercial agreement.

The screen shot 150 from the display shown in FIG. 3 includes a first portion 152 illustrating key risk areas of the contract and a second portion 154 next to the first portion illustrating a risk rating of the contract or aggregated risk.

In this example, in the first portion 152, there are 15 key risk areas identified by the user that are each illustrated by a bar of a bar chart 156. In this example, a showstopper is defined by a risk level or value of 10 and a high risk area is defined by a risk level or value of 8 or 9. The properties with showstopper or high risk level are displayed. In this example, the showstopper risk areas are displayed as limitation of liability and indemnities 158 and the high risk area is displayed as assignment, novation and other transfers 160.

In this example, in the second portion 154, the risk rating or aggregated risk that is calculated by comparing the risk determined by a computer 20*a*,20*b*,20*c*,20*d* of the computer system 10 of each predetermined property of a contract to predefined levels or values is displayed. In this example, the risk rating or aggregated risk is displayed as $^{24}/_{100}$ (or 24%). A schematic 162 of the display shows the risk level of each property defined by the user in a pie chart or ring. Risk levels may be either high, medium, low or okay. Each risk level is shown by a different colour 164*a*,164*b*,164*c*, 164*d*. The area of each colour is proportional to the number of properties that fall within the risk level the colour represents. The area of each colour is proportional to the weighted risk level associated to the properties the colour represents. The area may not be directly proportional to the volume of properties because one or more properties may be weighted to expose significantly higher risk.

Figure 4:
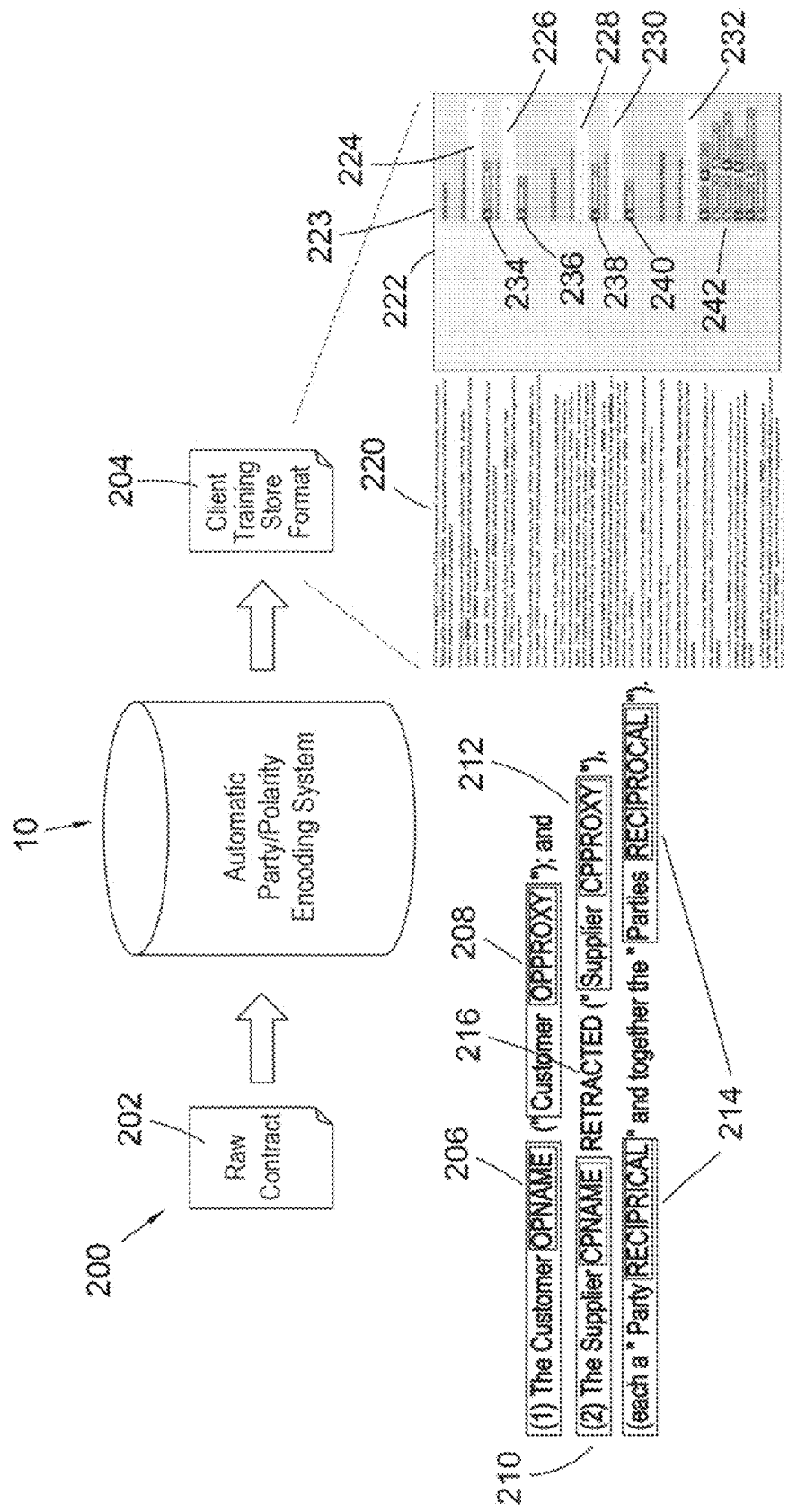
FIG. 4 is a schematic illustrating the computer system of FIG. 1.
Figure 5:
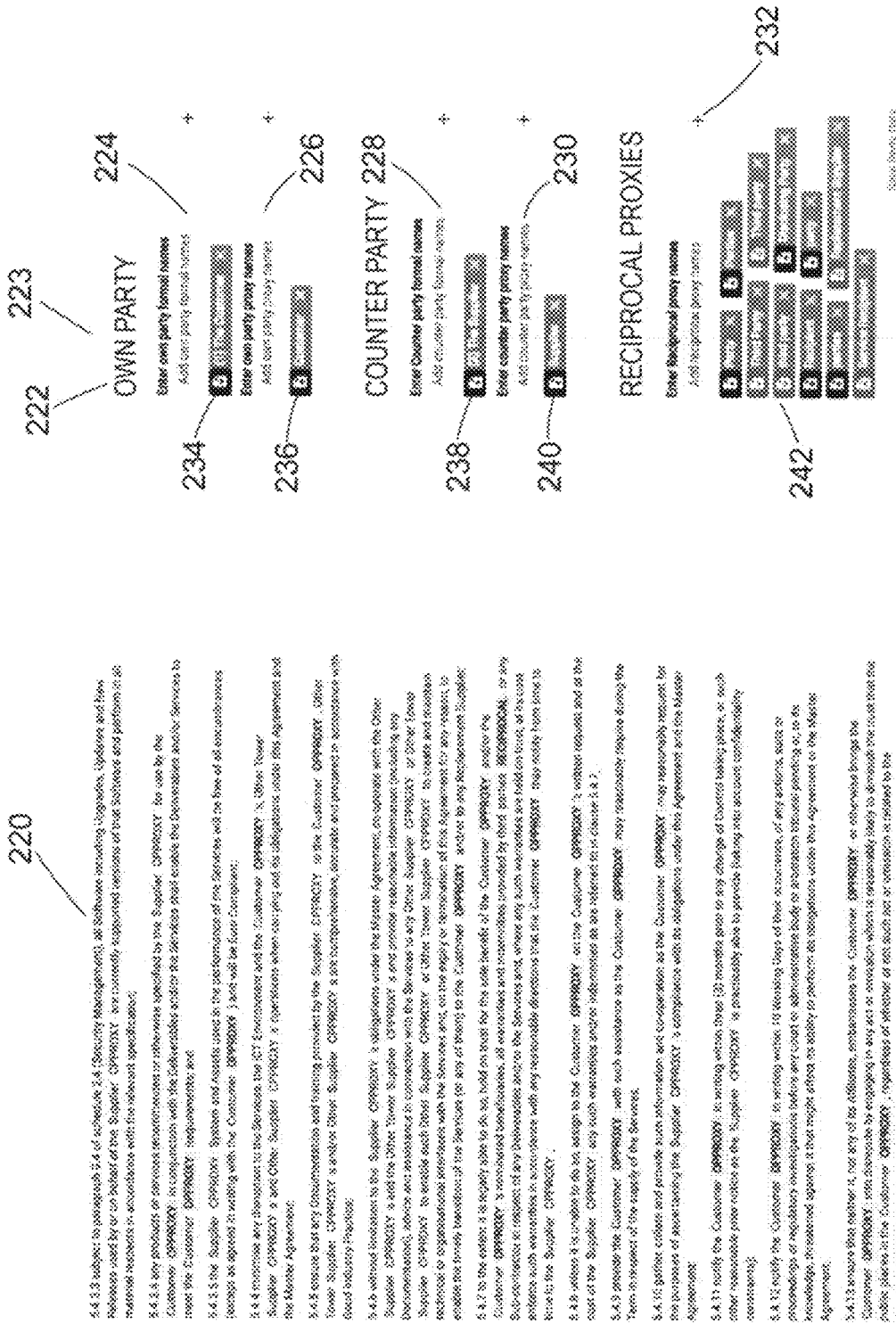
FIG. 5 is a schematic illustrating a portion of FIG. 4 in more detail.

The screen shot 150 of the display of FIG. 3 also includes a button 166 for a user to refer the contract for review to a human reviewer. If this button is selected or pressed, a notice or an e-mail is sent to a human reviewer with a copy of the contract attached to it. A schema 200 for generating the encoded training store format is illustrated in FIG. 4. Like features to FIG. 1 have been given like reference numerals. As explained in more detail above, broadly the computer system or automatic party/polarity encoding system 10 processes or encodes a document in the form of a contract or raw contract 202 to provide labels to replace determined data in the document stored in a store of the computer system (not shown in FIG. 4) and to produce encoded documents 204, in a client training store format, including the labels to replace the determined data in the documents. In this example, in the raw contract, the customer or obligor expressed as the own party's formal name is replaced by the label or tag 'OPNAME' 206, and any short reference to an own party is replaced by the label or tag 'OPPROXY' 208. In the raw contract of this example, a reference to the supplier or obligee or any counterparty's formal name is replaced by the label or tag 'CPNAME' 210, and any short reference to a counterparty is replaced by the label or tag 'CPPROXY' 212. In this example, in the raw contract, any reference that can semantically apply to any or all of the contracting parties (e.g. the word 'party') is replaced by the label or tag 'RECIPROCAL'. The computer system removes or retracts any information that identifies the parties in the contract and replaces it with, in this example, a label or tag stating 'RETRACTED' 216. These labels are illustrated across a portion of the raw contract to form the document in the encoded or client training store format 220. The labels are provided with or displayed with a coloured background in which the colour is dependent on the party or parties to whom the label is directed or routed, such as, in this example, whether the label is an own label, a counterparty label or a reciprocal label. In this example, own party labels have a green coloured background, counterparty labels have a yellow coloured background, and reciprocal party labels have a blue background.

Section 222 of FIG. 4 illustrates the user interface or graphical user interface (GUI) 223 of a review screen provided on a display of a computer of the computer system 10 for a user to manually determine the labels to be used. This portion is shown larger and in more in FIG. 5. Like features in FIGS. 4 and 5 have been given like reference numerals. The user interface includes a text entry box or portion 224 for entering own party formal names. Below this, the user interface includes a text entry box or portion 226 for a user to enter an own party proxy names. Below this, the user interface includes a text entry box or portion 228 for a user to enter counterparty formal names. Below this, the user interface includes a text entry box or portion 230 for a user to enter counterparty proxy names. Finally, below this, the user interface includes a text entry box or portion 232 for a user to enter a label or tag to be used for reciprocal names or, in other words, any reference that can semantically apply to any or all of the contracting parties. Below, each of these text entry boxes, the term of the raw contact or document that is to be replaced is displayed. In this example, the own party is '(1) The Customer' 234 which is displayed; the own party proxy is "Customer" 236 which is displayed; the counterparty is '(2) The Supplier' 238 which is displayed; the counterparty proxy is 'Supplier 240' which is displayed; and, finally, the reciprocal names or reciprocal names are displayed as: 'Party', 'Parties', 'Third Party', 'Third party', 'third party', 'Disclosing party', 'Recipient', 'party', 'parties', 'Replacement Supplier' and 'Service Recipient' 242.

Embodiments of the present invention have been described. It will be appreciated that variations and modifications may be made to the described embodiments within the scope of the present invention.

What is claimed is:

1. A computer implemented method implemented with a processing computer system in combination with a plurality of computers, wherein the processing computing system comprising a machine learning computer system and wherein each of the plurality of computers comprises a store, the method comprising:

the plurality of computers providing one or more labels to replace determined data in documents stored in the respective store of each of the plurality of computers, wherein each label comprises one of: a private label and a public label, wherein private labels are interpretable only by the computer of the plurality of computers that provided the private label and wherein the public labels are interpretable by all of the plurality of computers;

the plurality of computers producing encoded documents including the one or more labels to replace the determined data in the documents;

the plurality of computers assigning a routing token for directing the or each of the private labels to a private store of the machine learning computer system and the or each of the public labels to a public store of the machine learning computer system;

the plurality of computers directing training data to the processing computer system based on the routing token, wherein the training data comprises the encoded documents;

the processing computer system processing private labels and public labels; and the machine learning computer system receiving the encoded documents from the plurality of computers and training a respective model for each of the plurality of computers based on the private labels and the public labels, the training comprising the machine learning computer system using private labelled training data for training of only the model for the computer of the plurality of computers that provided the private label; and using public labelled training data for training the models for all of the plurality of computers;

wherein each of the plurality of computers receives the respective model from the machine learning computer system, and wherein each of the plurality of computers comprises a respective training model store for storing said received model.

2. The computer implemented method of claim 1, further comprising each of the plurality computers storing the or each private label at the store of the respective computer of the plurality of computers that provided the or each private label.

3. The computer implemented method of claim 1, wherein the documents comprise contracts or parties to the contracts.

4. The computer implemented method of claim 1, further comprising each of the plurality of computers normalising entities in different documents by providing identical labels for certain determined data.

5. The computer implemented method according to claim 3, wherein the determined data comprises parties to the contracts, and further comprising identical labels labelling certain determined data as an own party of a contract, a counterparty of a contract and a reciprocal party of a contract.

6. The computer implemented method according to claim 5, wherein an own party label is representative of an own party of a contract, a counterparty label is representative of one or more counterparties of a contract, and wherein a reciprocal party label is representative of all of the parties of a contract.

7. The computer implemented method of claim 1, further comprising each of the plurality of computers: interpreting a document following training of the respective models for each of the plurality of computers by the machine learning computer system; and displaying an indication of party risk based on the interpreting.

8. The computer implemented method of claim 7, further comprising each of the plurality of computers calculating party risk of a document by: identifying at least one term in a document; and comparing the at least one term with a risk policy for the identified term stored in each of the plurality of computers.

9. A non-transitory computer readable medium having stored thereon logic operable to cause a programmable computer system, comprising a machine learning computer system in combination with a plurality of computers, to perform actions comprising:

providing one or more labels to replace determined data in documents stored in a store of each of the plurality of computers, wherein each label comprises one of: a private label and a public label, wherein private labels are interpretable only by the computer of the plurality of computers that provided the private label and wherein the public labels are interpretable by all of the plurality of computers;

producing, with the plurality of computers, encoded documents including the one or more labels to replace the determined data in the documents;

assigning a routing token for directing the or each of the private labels to a private store of the machine learning computer system and the or each of the public labels to a public store of the machine learning computer system;

directing training data to the machine learning computer system based on the routing token, wherein the training data comprises the encoded documents;

processing private labels and public labels with the machine learning computer system;

receiving the encoded documents at the machine learning computer system from the plurality of computers and training a respective model for each of the plurality of computers based on the private labels and the public labels, the training comprising the machine learning computer system:

using private labelled training data for training of only the model for the computer of the plurality of computers that provided the private label; and using public labelled training data for training the models for all of the plurality of computers; and receiving at each of the plurality of computers the respective model that relates to each of the plurality of computers from the machine learning computer system, and storing the respective training model at each of the plurality of computers in a respective training model store.

10. The non-transitory computer readable medium of claim 9, wherein the documents comprise contracts or parties to the contracts and further comprising logic operable to cause each of the plurality of computers to normalise entities in different documents by providing identical labels for certain determined data.

11. The non-transitory computer readable medium according to claim 10 wherein the certain determined data comprises parties to the contracts, and further comprising identical labels labelling certain determined data as an own party of a contract, a counterparty of a contract and a reciprocal party of a contract wherein the own party label is representative of an own party of a contract, the counterparty label is representative of one or more counterparties of a contract, and wherein the reciprocal party label is representative of all of the parties of a contract.

12. The non-transitory computer readable medium of claim 9, further comprising logic operable to cause each of the plurality of computers to: interpret a document following training of the respective models for each of the plurality of computers by the machine learning computer system; and display an indication of party risk based on the interpreting.

13. The non-transitory computer readable medium of claim 9 further comprising logic operable to cause each of the plurality of computers to calculate party risk of a document by: identifying at least one term in a document; and comparing the at least one term with a risk policy for the identified term stored in each of the plurality of computers.

14. A computer system, comprising a machine learning computer system in combination with a plurality of computers programmed to perform actions comprising:

providing one or more labels to replace determined data in documents stored in a store of each of the plurality of computers, wherein each label comprises one of: a private label and a public label, wherein private labels are interpretable only by the computer of the plurality of computers that provided the private label and wherein the public labels are interpretable by all of the plurality of computers;

producing, with the plurality of computers, encoded documents including the one or more labels to replace the determined data in the documents;

assigning a routing token for directing the or each of the private labels to a private store of the machine learning computer system and the or each of the public labels to a public store of the machine learning computer system;

directing training data to the machine learning computer system based on the routing token, wherein the training data comprises the encoded documents;

processing private labels and public labels with the machine learning computer system;

receiving the encoded documents at the machine learning computer system from the plurality of computers and training a respective model for each of the plurality of computers based on the private labels and the public labels, the training comprising the machine learning computer system:

using private labelled training data for training of only the model for the computer of the plurality of computers that provided the private label; and using public labelled training data for training the models for all of the plurality of computers; and receiving at each of the plurality of computers the respective model that relates to each of the plurality of computers from the machine learning computer system, and storing the respective training model at each of the plurality of computers in a respective training model store.

15. The computer system of claim 14, wherein the documents comprise contracts or parties to the contracts and further comprising programming to cause each of the plurality of computers normalise entities in different documents by providing identical labels for certain determined data.

16. The computer system according to claim 15 wherein the certain determined data comprises parties to the contracts, and further comprising identical labels labelling certain determined data as an own party of a contract, a counterparty of a contract and a reciprocal party of a contract wherein the own party label is representative of an own party of a contract, the counterparty label is representative of one or more counterparties of a contract, and wherein the reciprocal party label is representative of all of the parties of a contract.

17. The computer system of claim 14, wherein the system further comprises programming operable to cause each of the plurality of computers to:

interpret a document following training of the respective models for each of the plurality of computers by the machine learning computer system; and display an indication of party risk based on the interpreting.

18. The computer system of claim 14 further comprising programming operable to cause each of the plurality of computers to calculate party risk of a document by:

identifying at least one term in a document; and comparing the at least one term with a risk policy for the identified term stored in each of the plurality of computers.

* * * * *